United States Patent [19]
Kim et al.

[11] Patent Number: 5,828,645
[45] Date of Patent: Oct. 27, 1998

[54] DISK REPRODUCING APPARATUS HAVING DISK CHANGING FUNCTION

[75] Inventors: Young-taek Kim, Suwon; Cheol-woong Ahn, Seoul, both of Rep. of Korea

[73] Assignee: Samsung Electronics Co., Ltd., Kyungki-do, Rep. of Korea

[21] Appl. No.: 723,571

[22] Filed: Sep. 30, 1996

[30] Foreign Application Priority Data

Sep. 30, 1995 [KR] Rep. of Korea .................. 1995-34009

[51] Int. Cl.⁶ .................................................. G11B 17/04
[52] U.S. Cl. ........................................................ 369/178
[58] Field of Search ........................... 369/178, 191–192, 369/36, 194; 360/92, 98.01, 98.02

[56] References Cited

U.S. PATENT DOCUMENTS

| | | | |
|---|---|---|---|
| 5,226,032 | 7/1993 | Ikedo et al. ............................... | 369/192 |
| 5,247,500 | 9/1993 | Miyoshi et al. .......................... | 369/192 |
| 5,508,994 | 4/1996 | Nakamichi et al. ..................... | 369/192 |
| 5,524,002 | 6/1996 | Morita et al. ............................ | 369/191 |

*Primary Examiner*—Allen Cao
*Attorney, Agent, or Firm*—Sughrue, Mion, Zinn, Macpeak & Seas, PLLC

[57] ABSTRACT

A disk reproducing apparatus having a disk changing function is provided and includes a clutch mechanism for switching power to selectively drive a clamping mechanism for securing a selected disk and an elevating mechanism for lifting and lowering a stocker receiving a plurality of sub-trays by using a single driving source. The clutch mechanism includes a motor installed on a main deck and having a motor gear, for generating power, a driving gear connected to the motor gear and which is rotated, a first connecting gear rotatably installed on the main deck and connected to the clamping mechanism, and a second connecting gear rotatably installed on the main deck, connected to the elevating mechanism, and located at a relative position lower than the first connecting gear. The clutch mechanism further includes a clutch gear assembly installed in engagement with the driving gear and operative to ascend and descend with respect to the main deck and having a clutch gear which is selectively engaged with the first and second connecting gears, and an operating mechanism for lifting and lowering the clutch gear assembly.

10 Claims, 12 Drawing Sheets

DISK REPRODUCING APPARATUS HAVING DISK CHANGING FUNCTION

BACKGROUND OF THE INVENTION

The present invention relates to a disk reproducing apparatus having a disk changing function where one among a plurality of received disks is selectively reproduced and, more particularly, to a disk reproducing apparatus having a disk changing function including a clutch means to selectively perform an action of securing a selected disk at a reproducing position and an action of lifting and lowering a stocker member, for receiving other disks not being reproduced, by a driving source.

A general disk reproducing apparatus having a disk changing function is one of the three following types: (1) a roulette type apparatus for reproducing a disk selected from a roulette receiving a plurality of disks on the same plane by rotating the roulette; (2) a magazine type apparatus for reproducing a disk selected from a fixed magazine for receiving a plurality disks stored vertically; (3) an elevator type apparatus for selecting one among a plurality of received disks from an ascendable and descendible magazine in which the plurality of disks are received and reproducing the selected disk.

These disk reproducing apparatuses having a disk changing function can selectively reproduce a plurality of received disks without the user having to change disks every time the user wishes to reproduce a different disk. On the other hand, when a user wishes to reproduce a disk not received in the apparatus, one of the received disks must be replaced, whereby current reproduction of a disk must be discontinued during the disk change operation.

FIG. 1 is a sectional view for schematically showing a disk reproducing apparatus having a disk changing function which is disclosed in Japanese Patent Laid-Open Publication No. Hei. 3-83264. The disclosed apparatus falls under an elevator-type disk reproducing apparatus having a disk changing function which is devised to solve the above problem. In this reproducing apparatus, a disk reproducing portion 31 is positioned at the front side adjacent to an opening 33 and a stocker 20 in which a plurality of subtrays $23_1$–$23_6$ are received is placed at the rear side thereof. Each subtray $23_2$–$23_6$ has a disk (not shown) loaded thereon. One subtray $23_1$ among the plurality of subtrays $23_1$–$23_6$ has no disk loaded thereon.

A clamp arm 64, by which a clamp 71 for securing a disk is supported, is ascendably and descendibly installed over the reproducing portion 31. Also, a main tray 30 for loading the subtrays $23_1$–$23_6$ thereon is slidably installed between the clamp 71 and the reproducing portion 31. Each of the plurality of subtrays $23_1$–$23_6$ is moved from the stocker 20 to the main tray 30 by rollers 91 and 92.

The elevator-type disk reproducing apparatus having a disk changing function has the following operations.

When a user wishes to reproduce a disk not received in the stocker 20, the subtray $23_1$ having no disk loaded thereon is moved to the main tray 30 by the rollers 91 and 92, and is extended outside through the opening 33 with the main tray 30. After a disk (not shown) to be reproduced is loaded on the subtray $23_1$, the main tray 30 and subtray $23_1$ are transported to the location of the reproducing portion 31. Then, the subtray $23_1$ is lowered by a predetermined operating means (not shown), thereby loading the disk on a turntable (not shown). The clamp arm 64 descends so that the disk is secured by the clamp 71.

Thus, in such a disk reproducing apparatus having a disk changing function, one of the plurality of subtrays $23_1$–$23_6$ has no disk loaded thereon so that a disk received in the stocker 20 does not need to be exchanged to reproduce a disk not received therein.

However, in the conventional disk reproducing apparatus having a disk changing function, a driving source for lifting and lowering the stocker 20 having the plural subtrays $23_1$–$23_6$ and a driving source for lifting and lowering the clamp 71 are additionally installed, respectively, which complicates the structure of the apparatus and increases the manufacturing cost.

SUMMARY OF THE INVENTION

To solve the above problems, it is an object of the present invention to provide a disk reproducing apparatus having a disk changing function which includes a clutching means by which an action of securing a selected disk at a reproducing position and an action of lifting and lowering a stocker having a plurality of subtrays received therein can be selectively performed by a single driving source.

To accomplish the above object, there is provided a disk reproducing apparatus having a disk changing function, comprising: a housing having a main deck and first and second chassis members installed at either side of the main deck; a subdeck installed on a rear side of the housing, pivotably supported at one side thereof on the first chassis member, and provided with disk reproducing elements including a turntable for loading a disk thereon and an optical pickup for generating and receiving optical beams; a plurality of subtrays positioned at a front side of the housing member, each of said subtrays having a loading surface on which a disk is loaded; a stocker, for receiving the plurality of subtrays, supported on the first and second chassis members and operative to ascend and descend; a main tray member, slidably supported on the first and second chassis members, for transporting one among the plurality of subtrays to be ejected out of the housing; first transporting means for moving the main tray; elevating means for lifting and lowering the stocker to place a selected subtray having a disk loaded thereon on the same level with the main tray; second transporting means for moving the selected subtray placed on the same level with the main tray to the turntable; clamping means for securing the selected disk loaded on the subtray moved to the turntable; and clutch means for switching power to selectively drive either the elevating means or the clamping means by a single driving source.

The clutch means comprises: a motor installed on the main deck and having a motor gear, for generating power; a driving gear connected to the motor gear and which is rotated; a first connecting gear rotatably installed on the main deck and connected to the clamping means; a second connecting gear rotatably installed on the main deck, connected to the elevating means, and located at a relative position lower than the first connecting gear; a clutch gear assembly installed in engagement with the driving gear and operative to ascend and descend with respect to the main deck and having a clutch gear which is selectively engaged with either the first connecting gear or the second connecting gear; and operating means for lifting and lowering the clutch gear assembly.

The operating means comprises: a slide plate having a vertical portion slidably supported on one of the first and second chassis members and an angled horizontal portion having a slot at an angled end thereof; driving means for moving the slide plate forward and backward in the housing; a link member slidably installed on the main deck and having a pin for combining with the slot, a lengthwise slot formed along the link member, and extended pieces extending from both sides of the lengthwise slot, each piece having a sloped portion; a shaft fixedly installed on the main deck, passing through the lengthwise slot, and to which the clutch gear assembly is ascendably and descendibly coupled; and a spring member combined with and positioned around the shaft, for elastically biasing the clutch gear assembly to the sloped portions of the extended pieces, wherein the clutch gear assembly ascends and descends according to movement of the link member so that the clutch gear is selectively engaged with either the first connecting gear or the second connecting gear.

It is preferable that the clutch gear assembly comprises: a boss rotatably combined with the clutch gear; and an elevating member on which a pair of extended protrusions contacting the sloped portions of the extended pieces, respectively, are formed.

Meanwhile, it is preferable that the driving means comprises: a motor; a cam gear rotatably driven by the power of the motor, and on one surface of which a cam groove is formed; and a cam pin for slidably engaging with the cam groove, formed on the slide plate, wherein the slide plate is moved by the rotation of the cam gear.

Also, the elevating means comprises: first and second vertical slots formed on the first and second chassis members, respectively; a slide member combined with the main deck and operative to slide forward and backward, and having a horizontal portion on which a rack gear portion connected to the second connecting gear is formed and vertical portions on which first and second stepped slots are formed at either side of the horizontal portion; and first and second guide pins for engaging with the first and second vertical slots, and first and second combining pins for combining with the first and second stepped slots, respectively, formed at either side of the stocker, wherein the stocker ascends and descends by the slide member moving forward and backward by the rotation of the second connecting gear.

The clamping means comprises: a cam pin formed on another side of the subdeck; a cylindrical cam member rotatably installed on the main deck, and having a cam groove with which the cam pin is slidably combined, formed on an outer circumferential surface thereof and a gear portion which is connected to the first connecting gear; and a fixing block provided over the subdeck, fixedly installed on the first and second chassis members, and on which a clamp member for pressing down on an upper surface of a selected disk loaded on the turntable is supported.

According to the characteristics of the present invention, in the disk reproducing apparatus according to the present invention, the ascending and descending action of the stocker member and the disk securing action are selectively performed by the clutching means by one driving source, which contributes to a reduction of the manufacturing cost.

BRIEF DESCRIPTION OF THE DRAWINGS

The above object and advantages of the present invention will become more apparent by describing in detail a preferred embodiment thereof with reference to the accompanying drawings, in which.

DETAILED DESCRIPTION OF THE PREFERRED EMBODIMENT

Figure 1:
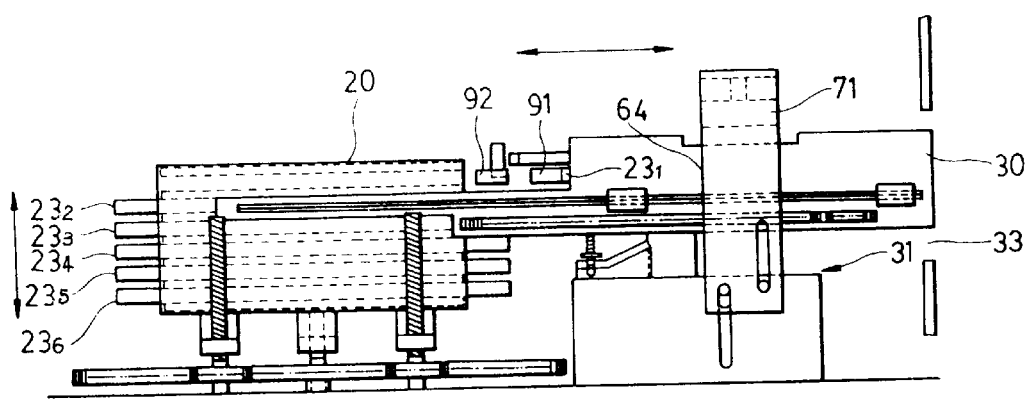
FIG. 1 is a schematic diagram of a conventional disk reproducing apparatus having a disk changing function.
Figure 2:
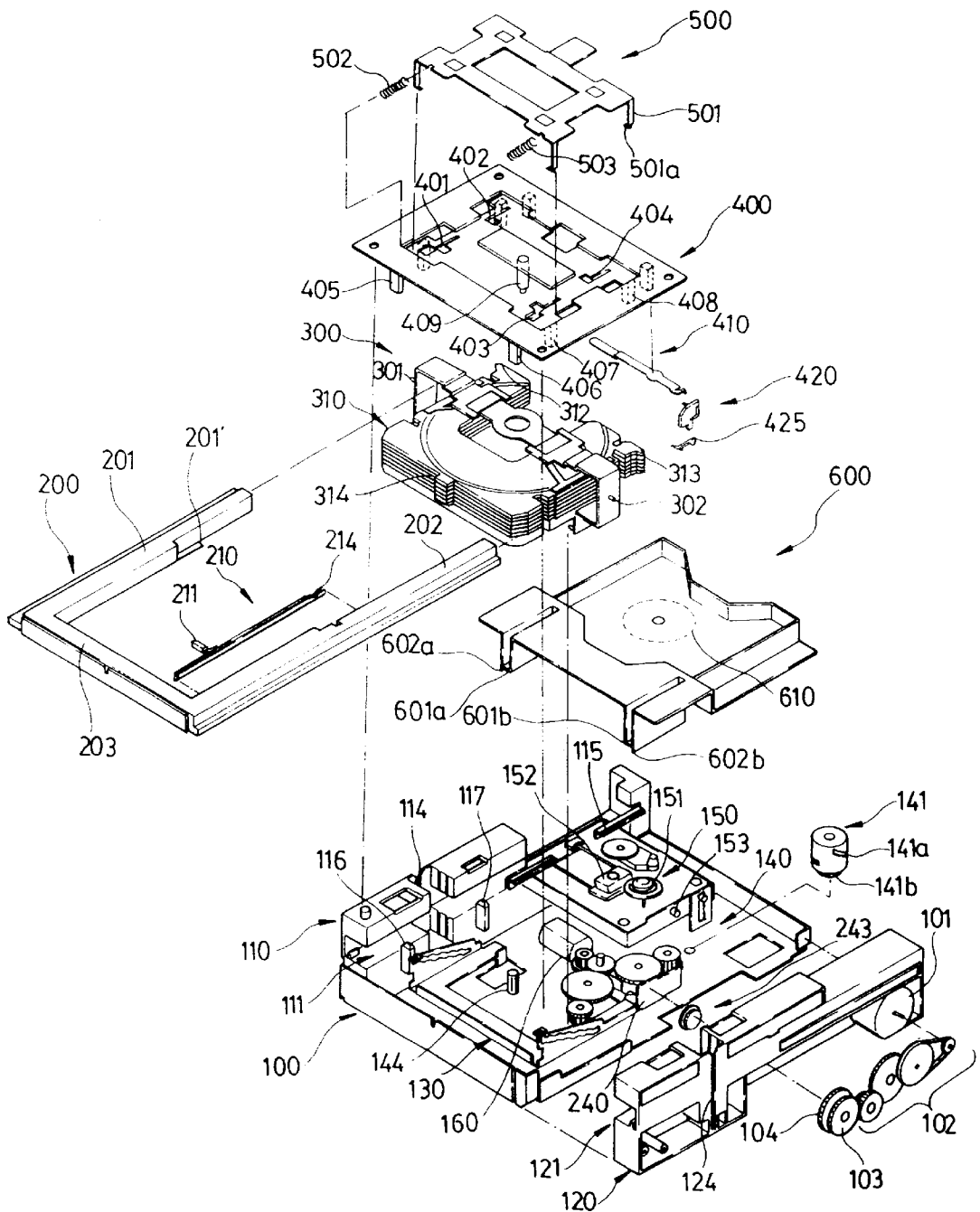
FIG. 2 is an exploded perspective view showing a disk reproducing apparatus having a disk changing function according to the present invention.

Referring to FIG. 2, a housing 100 includes a main deck 140 and first and second chassis members 110 and 120 installed opposite each other at the right and left sides of the main deck 140.

A subdeck 150 which is pivotally supported at one side on the first chassis member 110 is installed at the rear side of the inside of the housing 100. Elements for reading and obtaining information from a disk (not shown), such as, a turntable 151 for loading a disk thereon and an optical pickup 152 having an object lens are provided on the subdeck 150.

Also, at the front side of the inside of the housing 100, a stocker 300 is supported on the first and second chassis members 110 and 120 to be able to ascend and descend by a predetermined elevating means. A plurality of subtrays 310 having a surface 311 (see FIG. 3) for loading a disk thereon are stacked on the stocker 300.

A main tray 200 is slidably combined with the first and second chassis member 110 and 120.

Figure 3:
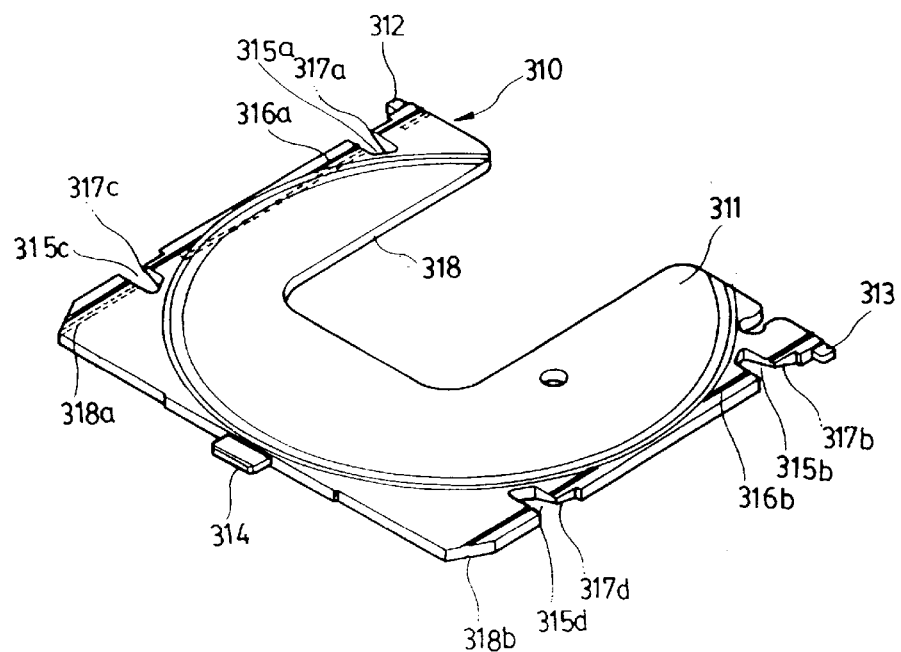
FIG. 3 is a perspective view showing a subtray employed in the present invention.
Figure 4:
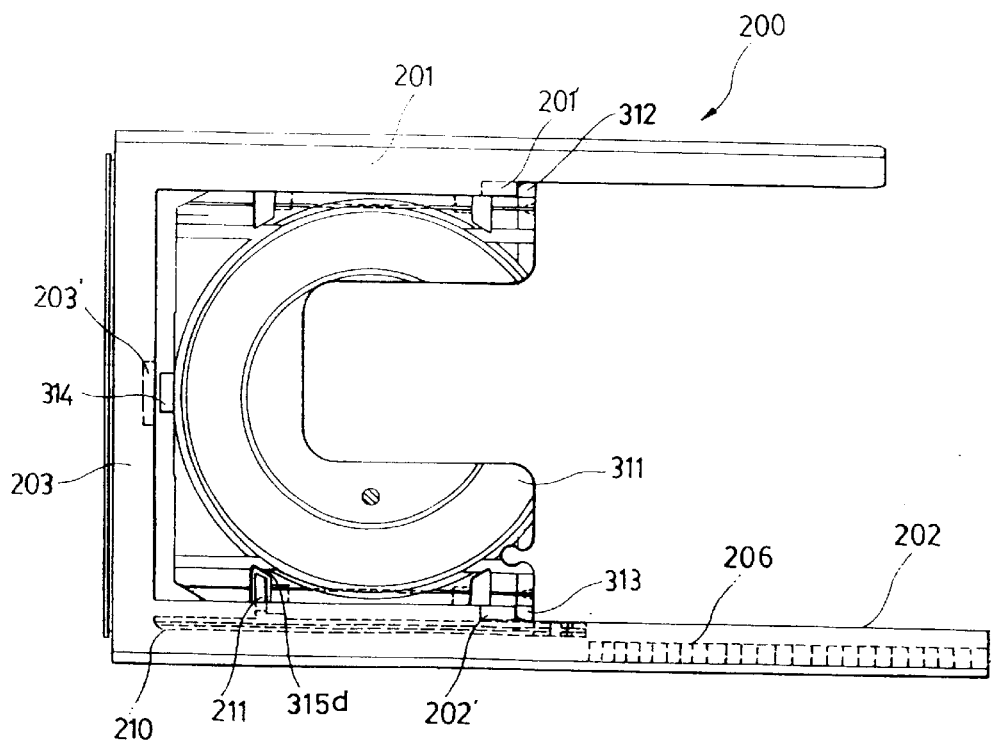
FIG. 4 is a plan view showing the subtray combined with a main tray member in the present invention.

Referring to FIGS. 2 through 4, the main tray 200 is formed in a "c" shape having two arm portions 201 and 202 parallel to each other, which are slidably combined with the first and second chassis members 110 and 120, and an intermediate portion 203 connecting the two arm portions to each other. Support projections 201' and 202' are formed at the sides of the two arm portions 201 and 202, respectively, and a support groove 203' is formed inside the intermediate portion 203. Meanwhile, projections 312 and 313 which are supported by the support protrusions 201' and 202' and a combining projection 314 for combining with the support groove 203' are formed on the subtray 310.

Figure 5:
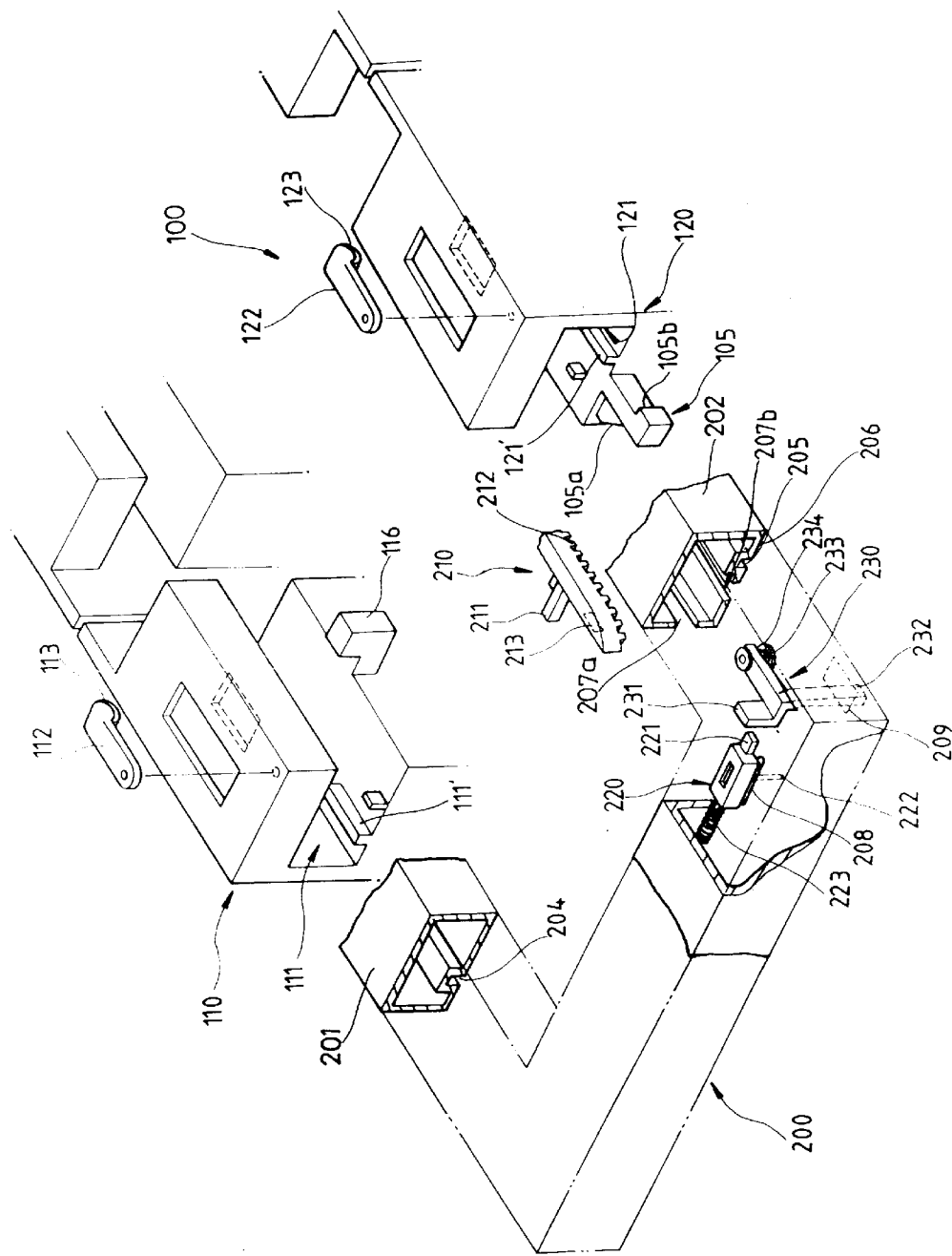
FIG. 5 is a schematic perspective view showing locking structures of the main tray and the subtray shown in FIG. 4.

Also, as shown in FIGS. 2 and 5, the first and second chassis members 110 and 120 have sliding openings 111 and 121 wherein the arm portions 201 and 202 of the main tray 200 slide through and combine with the sliding openings 111 and 121. Guide protrusions 111' and 121' are formed on the lower surfaces of the sliding openings 111 and 121, respectively. Guide grooves 204 and 205 to be slidably coupled to the guide protrusions 111' and 121' are formed on the bottom surfaces of the arm portions 201 and 202 of the main tray 200, respectively. The arm portions 201 and 202 of the main tray 200 are combined with the inside of the stocker member 300.

Also, plates 112 and 122 which are elastically deformable are fixed on the first and second chassis members 110 and 120, respectively, at the ends of which roller members 113 and 123 contacting the upper surfaces of the arm portions 201 and 202 of the main tray 200 are rotatably supported. Thus, the main tray 200 can be stably moved by the roller members 113 and 123 without upward or downward shaking.

The main tray 200 protrudes forwardly from the housing 100, together with one of the plurality of subtrays 310, by a first transporting means.

The first transporting means is constructed as follows. Referring to FIGS. 2, 4 and 5, a rack gear 206 is formed on the bottom surface of the arm portion 202 of the main tray 200. A gear train 102 which is driven by the power of a motor 101 and first and second gears 103 and 104 concentrically installed are provided on the second chassis member 120. The rack gear 206 interlocks with the first gear 103.

Figure 6:
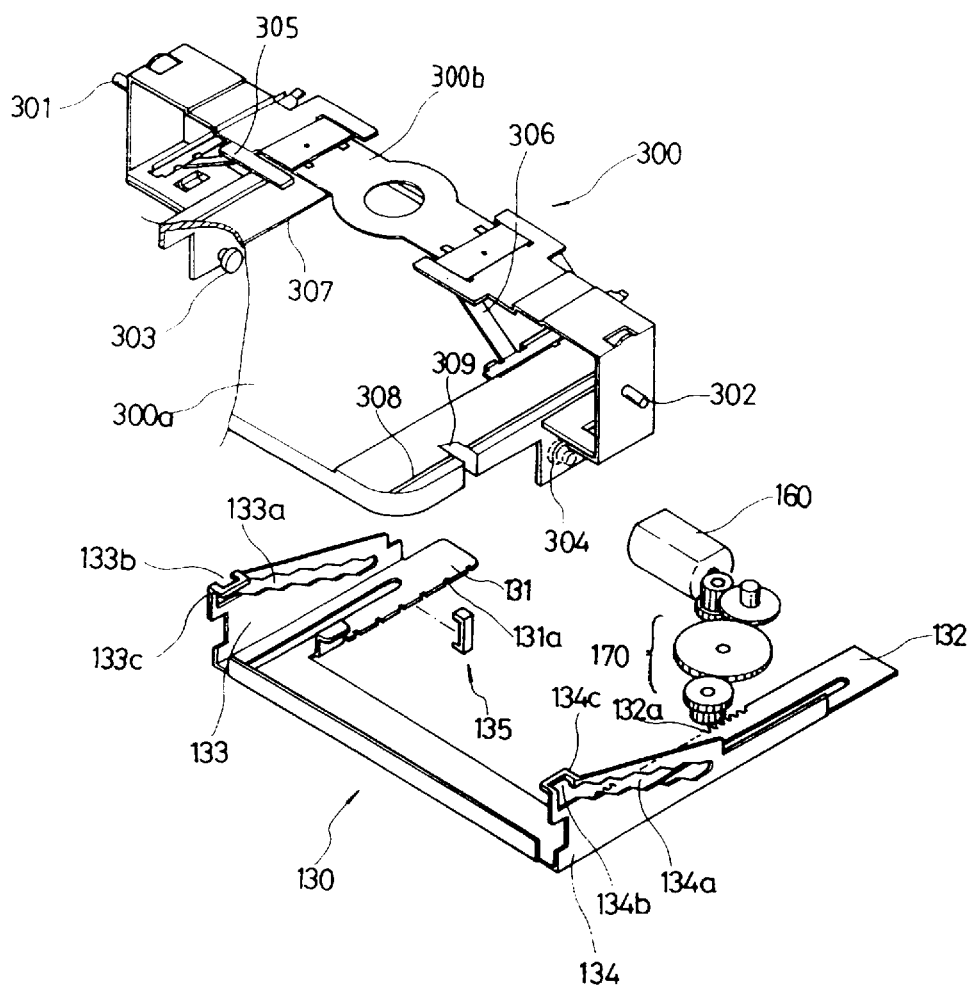
FIG. 6 is a perspective view showing the elevating structure of a stocker in the present invention.

Referring to FIGS. 2 and 6, the elevating means for lifting and lowering the stocker 300 has the following structure. First and second vertical slots 114 and 124 are formed on the first and second chassis members 110 and 120, respectively. A slide member 130 having parallel horizontal portions 131 and 132 and vertical portions 133 and 134 is slidably installed on the main deck 140. The vertical portions 133 and 134 respectively having first and second stepped slots 133a and 134a are extended from the edges of the horizontal portions 131 and 132. A rack gear 132a is formed on one horizontal portion 132 of the slide member 130. Also, a motor 160 and a gear train 170 for connecting the motor 160 to the rack gear 132a are installed on the main deck 140.

First and second guide pins 301 and 302 for coupling to the first and second vertical slots 114 and 124 and first and second combining pins 303 and 304 for combining with the first and second stepped slots 133a and 134a are formed on the side portions of the stocker 300.

Thus, when the slide member 130 is moved forward and backward by the driving force of the motor 160, the stocker 300 ascends and descends.

The first and second stepped slots 133a and 134a have a staircase shape and have the same number of steps as the number of subtrays 310 which are received in the stocker 300. Also, a plurality of grooves 131a is formed at constant intervals on the other horizontal portion 131 of the slide member 130. The number of grooves 131a is also the same as the number of subtrays 310 to be received in the stocker 300. A sensor 135 for sensing the passing of the grooves 131a is installed on the main deck 140. Accordingly, while the stocker 300 ascends and descends by the slide member 130 which is moved by the driving force of the motor 160, the sensor 135 performs a sensing operation to a given groove 131a, and, at the same time, power applied to the motor 160 is interrupted.

Meanwhile, first and second extension pieces 133c and 134c having first and second horizontal holes 133b and 134b connected to the first and second stepped slots 133a and 134a are formed on the vertical portions 133 and 134 of the slide member 130. At this time, the first and second extension pieces 133c and 134c are formed at right angles to the vertical portions 133 and 134.

Thus, the first and second combining pins 303 and 304 can be combined with the first and second stepped slots 133a and 134a through the first and second horizontal holes 133b and 134b. That is, the vertical portions 133 and 134 of the slide member 130 do not need to be elastically deformed, in order to combine the first and second combining pins 303 and 304 with the first and second stepped slots 133a and 134a.

When a subtray 310, on which a disk is loaded, selected from the plurality of subtrays 310 which are lifted and lowered by the predetermined elevating means is positioned on the same plane with the main tray 200, a second transporting means transports the subtray 310 to the turntable 151, i.e., to a reproducing position.

Referring to FIGS. 2 through 5, the second transporting means is constructed as follows. A plurality of guide grooves 315a to 315d (FIG. 3) are formed at the peripheral portions of the subtray 310. A moving member 210 (FIG. 5) is slidably coupled to main tray 200. A protrusion 211 is formed on the moving member 210 for combining with the guide groove 315d, and a rack gear portion 212 is formed on the bottom surface of the moving member 210. A first opening 207a through which the protrusion 211 of the moving member 210 protrudes and a second opening 207b through which the rack gear portion 212 thereof is protruded are formed on the main tray 200. The rack gear portion 212 engages with the second gear 104 (FIG. 2). Thus, the moving member 210 can be moved with respect to the main tray 200 by the driving force of the motor 101. In addition, since the protrusion 211 of the moving member 210 is combined with the guide groove 315d of the subtray 310, the subtray 310 can move according to the movement of the moving member 210.

Also, a guide means is provided for guiding the subtray 310 from the stocker 300 to the turntable 151.

Referring to FIGS. 2 and 3, the guide means includes guide ribs 316a and 316b formed at either side on the upper surfaces of the subtray 310, guide length grooves 318a and 318b formed on the bottom surfaces thereof, and guide rails 115, to which the guide length grooves 318a and 318b of the subtray 310 slidably combine, formed on the first and second chassis members 110 and 120.

Meanwhile, a first locking means is provided for locking the moving member 210 to the main tray 200 and releasing the lock. Referring to FIG. 2, when the moving member 210 is locked to the main tray 200, a selected subtray 310 is moved with the main tray 200 to thus extend outward from the housing 100. On the other hand, when the moving member 210 is unlocked from the main tray 200, the subtray 310 can be moved to a reproducing position with the moving member 210. At this time, the main tray 200 is locked to the housing 100.

The first locking means is constructed as follows. Referring to FIG. 5, a locking groove 213 is formed on one side surface of the moving member 210. A fixing protrusion 105 having a sloped surface 105a is formed on the end portion of the front side of the chassis member 120. A moving block 220 on which a releasing pin 222 engaging with the sloped surface 105a and a locking protrusion 221 combining with the locking groove 213 of the moving member 210 are formed is combined with the main tray 200 so as to slide in a direction perpendicular to the moving direction of the moving member 210. A spring 223 for elastically biasing the moving block 220 toward the moving member 210 is combined with the inside of the main tray 200. The releasing pin 222 protrudes outward through a slot 208 formed on the main tray 200.

According to the above configuration of the first locking means, when the main tray 200 moves toward the housing 100, the releasing pin 222 is guided onto the sloped surface 105a. At this time, the moving block 220 is moved to compress the spring 223, when the locking protrusion 221 separates from the locking groove 213 of the moving member 210. On the other hand, when the main tray 200 is ejected from the housing 100, the releasing pin 222 separates from the sloped surface 105a of the fixing protrusion 105, and the moving block 220 moves toward the moving member 210 by the restoring force of the spring 223. At this time, the locking protrusion 221 of the moving block 220 is inserted into the locking groove 213 of the moving member 210.

Meanwhile, a second locking unit for locking the main tray 200 to the housing 100 is constructed as follows. At this time, the second locking unit prevents the main tray 200 from automatically being ejected from the housing 100.

Referring to FIG. 5, a locking projection 105b is formed on the fixing protrusion 105. A rotating lever 230 having a locking piece 232 for locking with the locking projection 105b is pivotably supported by a hinge pin 234 inside the main tray 200. A torsion spring 233 for elastically biasing the rotating lever 230 is provided to maintain a locked state of the locking piece 232 to the locking projection 105b. Also, a releasing piece 231 for releasing the locked state by interlocking with the moving member 210 is formed on the rotating lever 230. The locking 232 protrudes outward through a hole 209 formed on the main tray 200.

According to the configurations of the first and second locking means, the elasticity of the spring 223 is stronger than that of the torsion spring 233. Thus, with the main tray 200 ejected from the housing 100, the moving block 220 is moved toward the rotating lever 230 by the spring 223. At this time, the rotating lever 230 is in a rotated state, while elastically deforming the torsion spring 233.

Meanwhile, a clamping means for securing a disk loaded on the turntable 151 has the following structure.

Referring to FIG. 2, the subdeck 150 is supported at one side by the first chassis member 110, and pivotable by a predetermined pivoting means. A fixing block 600, on which a clamping member 610 for pressing down on the upper surface of the disk loaded on the turntable 151 is supported, is fixed on the first and second chassis members 110 and 120. The fixing block 600 is provided with slide length grooves 601a and 601b to which the guide ribs 316a and 316b (see FIG. 3) of the subtray 310 slidably combine and guide projections 602a and 602b for guiding both sides of the subtray 310.

When the subdeck 150 is moved upward by the pivoting means, the disk is secured between the turntable 151 and the clamping member 610.

The pivoting means for moving the subdeck 150 upward and downward is constructed as follows.

Figure 7:
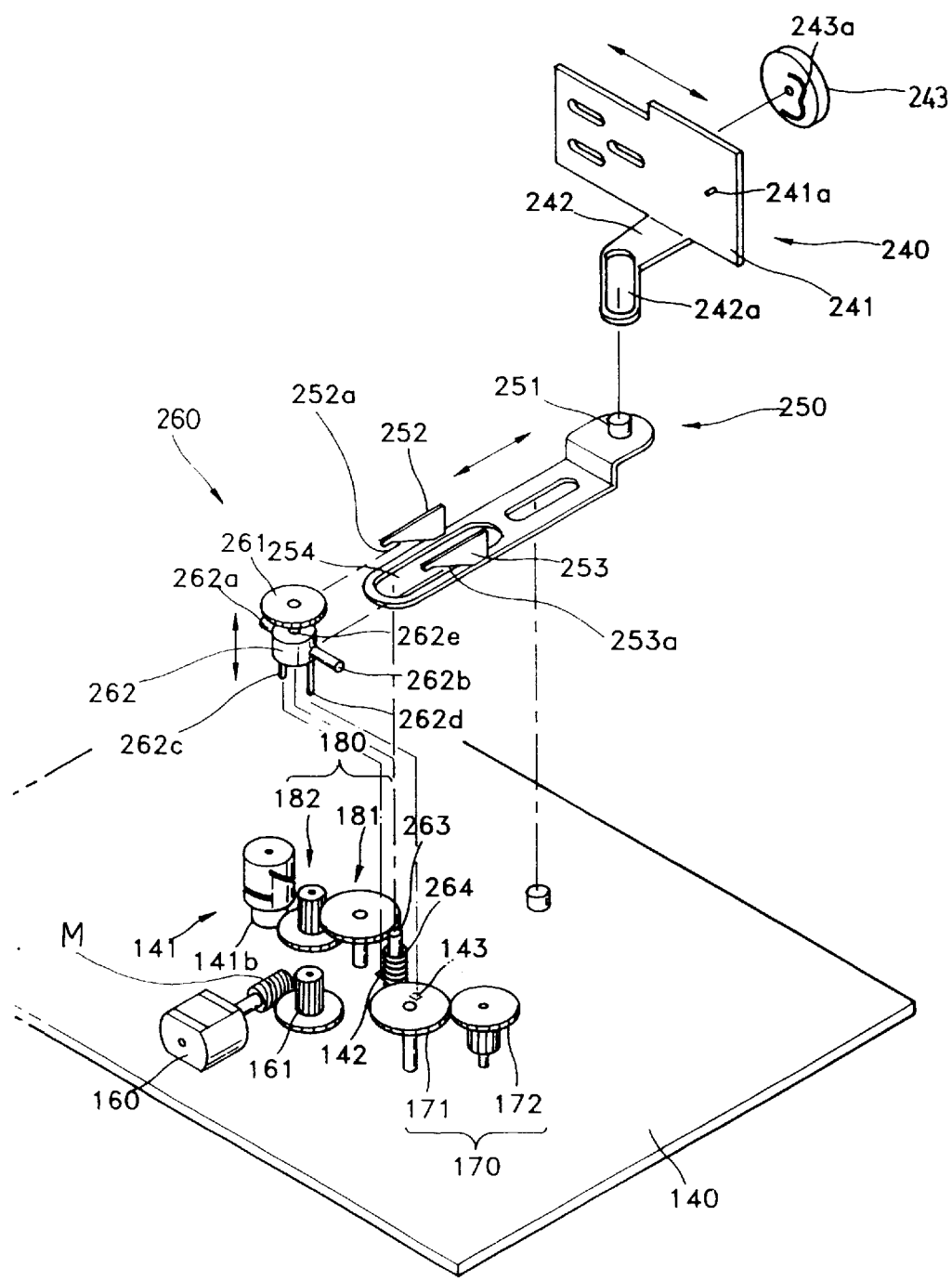
FIG. 7 is a perspective view showing extracted essential parts of a clutch means according to the present invention.

Referring to FIGS. 2 and 7, a cam pin 153 is formed on the free edge of the subdeck 150. Also, a cylindrical cam member 141 having a cam groove 141a to which the cam pin 153 is slidably coupled and a gear 141b is rotatably installed on the main deck 140. The cam groove 141a is formed on the outer circumferential surface of the cam member 141, and the gear 141b is formed on the bottom surface thereof. Also, the motor 160 and a gear train 180 for connecting the motor 160 to the gear 141b of the cam member 141 are installed on the main deck 140. Thus, if the cam member 141 is rotated by the driving force of the motor 160, the subdeck 150 moves upward or downward.

According to a characteristic configuration of the present invention, the elevating means for raising and lowering the stocker 300 and the clamping means for securing the selected disk are operated by a clutch means for selectively transmitting the driving force of the motor 160.

Referring to FIGS. 2 and 7, the clutch means is constructed as follows.

A driving gear 161, which rotates by being connected to a motor gear M of the motor 160, is installed on the main deck 140, at one side of which a dual gear 182 for connecting to the gear 141b of the cam member 141 and a first connecting gear 181 are installed. Also, the gear train 170 having a dual gear 172 for connecting to the rack gear portion 132a (see FIG. 6) of the slide member 130 and a second connecting gear 171 is installed at the other side of the driving gear 161 on the main deck 140. The second connecting gear 171 is installed at a relative position lower than the first connecting gear 181.

A clutch gear assembly 260 having a clutch gear 261 which selectively engages with one of the first and second connecting gears 181 and 171 is installed so as to be able to ascend and descend by a predetermined operating means. The clutch gear 261 is installed so as to be able to ascend and descend with respect to the main deck 140 in engagement with the driving gear 161.

The operating means for operating the clutch gear assembly 260 is constructed as follows.

As shown in FIGS. 2 and 7, a slide plate 240, having a vertical portion 241 slidably supported on the second chassis member 120 and an angled horizontal portion 242 provided with a slot 242a in the angled horizontal portion 242, is supported on the second chassis member 120 such that it can slide forward and backward on the housing 100 by a predetermined driving means. Also, a link member 250 is installed on the main deck 140 so as to be able to move perpendicular to the moving direction of the slide plate 240. The link member 250 includes a pin 251 which is combined with the slot 242a, a lengthwise slot 254 formed along the length of the link member 250, and extended pieces 252 and 253 having sloped portions 252a and 253a and extended from the borders of both sides of the lengthwise slot 254.

A shaft 263, which protrudes through the lengthwise slot 254 of the link member 250 and on which the clutch gear assembly 260 is ascendably and descendibly combined, is fixedly installed on the main deck 140. A spring 264 for elastically biasing the clutch gear assembly 260 toward the sloped portions 252a and 253a of the extended pieces 252 and 253 is combined with and positioned around the shaft 263.

The clutch gear assembly 260 includes the clutch gear 261 and an elevating member 262 provided with a boss 262e rotatably combined with the clutch gear 261 and extended protrusions 262a and 262b which contact the sloped portions 252a and 253a, respectively.

Meanwhile, a means for preventing rotation upon the ascent and descent of the elevating member 262 is further provided in which two guide posts 262c and 262d are formed extending from the bottom surface of the elevating member 262, and guide holes 142 and 143 into which the guide posts 262c and 262d are slidably combined are formed on the main deck 140.

The driving means for transporting the slide plate 240 is constructed as follows. Referring to FIGS. 2 and 7, a motor 101 for generating a driving force is installed on the outer side of the second chassis member 120. The motor 101 is the power source for transporting the main tray 200. Also, a cam gear 243 which is rotated by the driving force of the motor 101 is installed on the inner side of the second chassis member 120. A cam groove 243a is formed on the cam gear 243. A cam pin 241a which combines with the cam groove 243a is formed on the slide plate 240. The cam gear 243 is installed on the same shaft as the first and second gears 103 and 104. Thus, the slide plate 240 is moved forward and backward by the rotation of the cam gear 243. Also, the link member 250 interlocked with the slide plate 240 is moved perpendicular to the moving direction of the slide plate 240. At this time, the clutch gear assembly 260 ascends and descends by interlocking with the extended pieces 252 and 253. Thus, the clutch gear 261 is selectively engaged with the first and second connecting gears 171 and 181.

Meanwhile, when the selected subtray 310 is moved to the turntable 151 by the second transporting means, a lifting means needs to be provided to lift the other subtrays remaining over the selected subtray 310.

Referring to FIGS. 2 and 8 through 11, the lifting means is constructed as follows. A plurality of guide holes 401 through 404 are formed on a fixing plate 400. Also, a support plate 500 for supporting the subtrays 310 is installed on the upper surface of the fixing plate 400, and can be moved by a predetermined manipulating means. The support plate 500 is connected to the fixing plate 400 by springs 502 and 503. Also, a plurality of support pieces 501 which combine with the plurality of guide holes 401 through 404, respectively, are formed on the support plate 500. On each end portion of the support pieces 501, a folded support portion 501a is formed to support the subtrays 310. The support pieces 501 are coupled with the guide grooves 315a to 315d (see FIG. 3) of the subtrays 310, respectively. Also, sloped surfaces 317a to 317d on which the support portions 501a are respectively supported are formed on the edges of the subtrays 310. The manipulating means serves to move the support plate 500 to transfer the support portions 501a from the guide grooves 315a to 315d of the subtrays 310 to the sloped surfaces 317a to 317d.

The manipulating means is constructed as follows. A lever member 410 is rotatably supported on the bottom surface of the fixing plate 400. One end of the lever member 410 is rotatably connected to the support plate 500, and the other end thereof is positioned on the upper portion of the second chassis member 120. Also, a rotating body 420 connected to the other end of the lever member 410 is installed on the second chassis member 120, and can be moved by a predetermined rotating means.

The rotating means is constructed as follows. A recessed portion 214 (FIG. 8) is formed on the upper surface of the moving member 210 slidably combined with the main tray 200. The moving member 210 is transported in engagement with the second gear 104 (FIG. 2) which is rotated by the driving force of the motor 101. An engaging member 425, on which a protrusion 425a slidably contacting the upper surface of the moving member 210 is formed, is pivotably supported inside the main tray 200. The rotating body 420 contacts the upper surface of the engaging member 425. The rotating body 420 is elastically biased by a torsion spring (not shown) to press down on the upper surface of the engaging member 425. Thus, when the protrusion 425a interlocks with the recessed portion 214 of the moving member 210, the rotating body 420 is rotated. At this time, the lever member 410 is rotated, thereby moving the support plate 500 in a certain direction.

Referring to FIG. 6, springs 305 and 306 for elastically pressing down on the upper surface of the subtray 310 are installed on the stocker 300. The springs 305 and 306 keep the plurality of subtrays 310 stacked on top of one another stable.

Meanwhile, a departure preventing means is provided for preventing the departure of the plurality of subtrays 310 supported on the stocker 300.

The departure preventing means is constructed as follows. Referring to FIGS. 2 and 3, an opening 318, into which the turntable 151 enters, is formed on the subtray 310. A first post 144 is installed perpendicular to the main deck 140, and a second post 409 aligning with the first post 144 is formed on the bottom surface of the fixing plate 400. The free ends of the first and second posts 144 and 409 maintain an interval through which only one of the piled subtrays 310 can pass.

Figure 12:
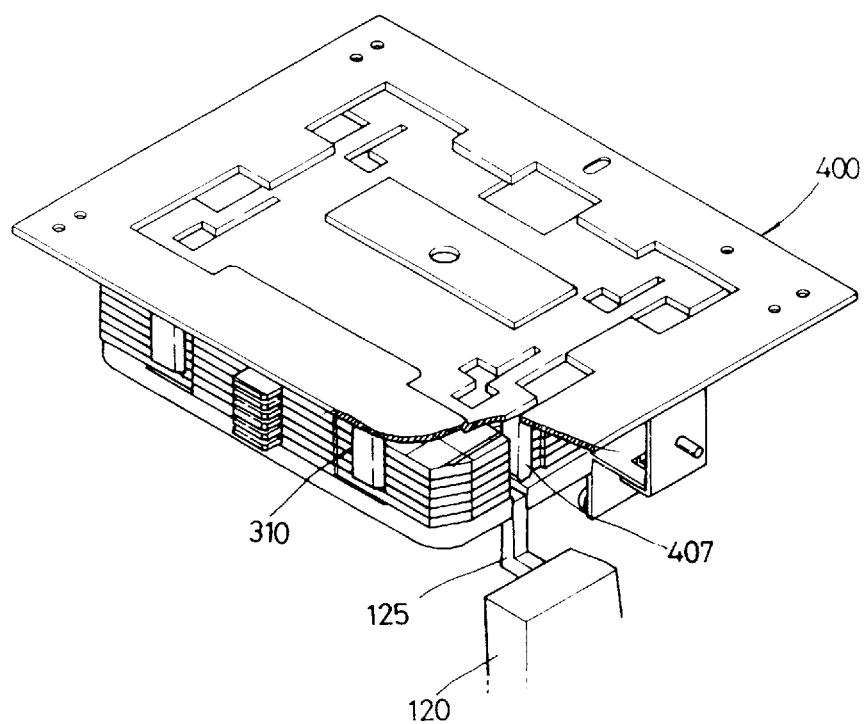
FIG. 12 is a perspective view showing subtrays stacked on the stocker.

Meanwhile, extended protrusions 405 and 406 supporting the front and back edges of the piled subtrays 310 and combining protrusions 407 and 408 combining with the guide grooves 315a through 315d of the subtrays 310 to support the edges of the subtrays 310 are formed on the bottom surface of the fixing plate 400. Also, as shown in FIGS. 2, 5 and 12, auxiliary protrusions 116, 117 and 125 which are coupled to the guide grooves 315a to 315d of the subtrays 310 are formed on the inner sides of the first and second chassis members 110 and 120, respectively.

The interval between the auxiliary protrusions 116, 117 and 125 and the combining protrusions 407 and 408 formed on the fixing plate 400 is the same as that of the first and second posts 144 and 409. Furthermore, the interval of the former is formed at the same position as that of the latter.

The operation of the disk reproducing apparatus having a disk changing function according to the present invention will be explained in detail with reference to the accompanying drawings.

Figure 15:
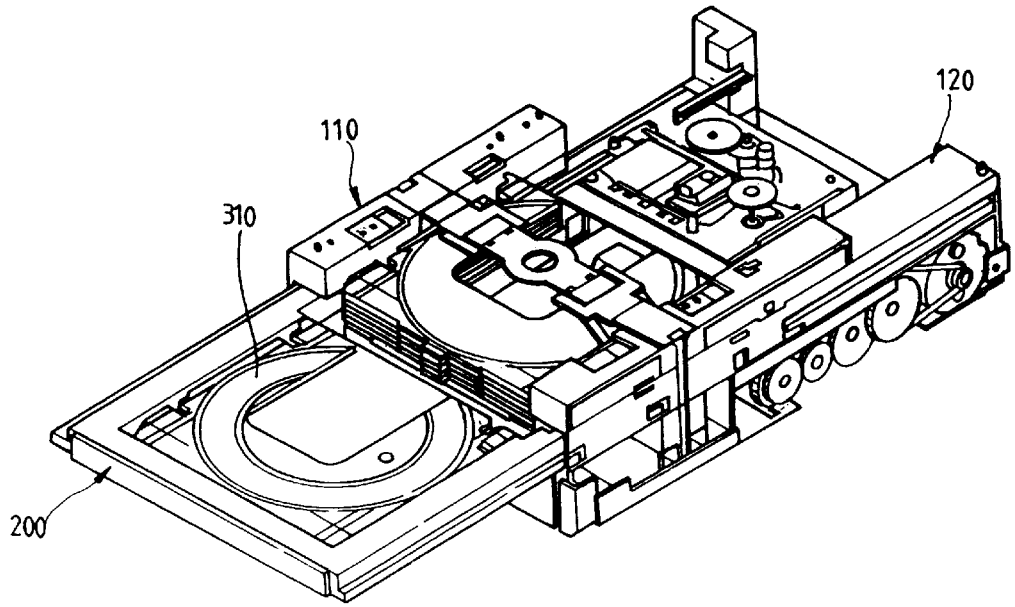
FIG. 15 is an assembled perspective view of the disk reproducing apparatus having a disk changing function shown in FIG. 2, which shows a subtray extended together with the main tray.

The action of moving a selected disk to load it on the turntable 151 is as follows. Referring to FIGS. 2, 5, 14, 15, and 16, the main tray 200 is locked to the housing 100 as described above. That is, the main tray 200 (FIG. 2) is transported to the inside of the housing 100 by the driving force of the motor 101. At this time, a subtray 310 is combined with and on the main tray 200 as shown in FIG. 15. The combining projection 314 of the subtray 310 is combined with the support groove 203' of the main tray 200, and the projections 312 and 313 are supported on the support projections 201' and 202' (see FIG. 4). The moving member 210 (FIG. 5) is locked to the moving block 220 provided on the front edge portion of the main tray 200. At this time, the locking protrusion 221 of the moving block 220 is combined with the locking groove 213 of the moving member 210. The moving block 220 is elastically biased toward the rotating lever 230 by the spring 223. Thus, the rotating lever 230 is maintained in the state of being rotated to the side direction.

In such a state, the main tray 200 enters the housing 100 by the driving force of the motor 101. At this time, the first gear 103 engages with the rack gear 206 of the main tray 200, while the second gear 104 races. When the main tray 200 is almost completely entered therein, the locking of the moving member 210 is released by the releasing pin 222 of the moving block 220 sliding on the sloped surface 105a of the fixing protrusion 105. At the same time, the rotating lever 230 is rotated by the torsion spring 233 and thus locked to the locking projection 105b. In this way, the main tray 200 is locked to the housing 100.

With the main tray 200 locked to the housing 100, the first gear 103 is separated from the rack gear 206 of the main tray 200, while the second gear 104 is engaged with the rack gear 212 of the moving member 210. That is, referring to FIG. 4, the rack gear 206 is partly formed on the arm portion 202 of the main tray 200. The length of the moving member 210 is shorter than that of the arm portion 202 of the main tray 200. Thus, the rack gear 206 of the main tray 200 is separated from the first gear 103, while the rack gear 212 of the moving member 210 engages with the second gear 104. At this time, the subtray 310 combined with the main tray 200 departs from the main tray 200.

The moving member 210 is moved inward a short distance the housing 100 by the driving force of the motor 101. Thus, in the subtray 310 supported on the main tray 200, the combining projection 314 separates from the support groove 203', and the projections 312 and 313 separate from the support projections 201' and 202' as shown in FIG. 4. The subtray 310 is at a receiving position of the stocker 300.

Referring to FIGS. 2 and 7, as described above, while one subtray 310 combined with the main tray 200 is received in the stocker 300, the clutch gear 261 is engaged with the second connecting gear 171 by the clutch means which is operated by the driving force of the motor 101.

At this time, the stocker 300 ascends and descends by the elevating means, in order that a subtray 310 having a selected disk loaded thereon may be positioned at the same elevation as that of the main tray 200. During the operation of the elevating means, the motor 101 comes to a standstill. When the stocker 300 stops at a predetermined position, the selected subtray 310 is placed between the first and second posts 144 and 409.

The operation of the clutch means and elevating action are described in detail as follows. When the cam gear 243 is rotated by the driving force of the motor 101, the slide plate 240 is moved toward the back of the housing 100, and the link member 250 is moved toward the first chassis member 110. At this time, the elevating member 262 is depressed by the extended pieces 252 and 253 of the link member 250 and descends. Thus, the clutch gear 261 engages with the second connecting gear 171. Then, if the motor 160 is driven, the slide member 130 is moved forward or backward, thereby lifting or lowering the stocker 300. If the selected subtray 310 is placed on the same level with the main tray 200 as described above, the motor 160 comes to a pause.

Then, when the motor 101 is driven, the link member 250 moves toward the second chassis member 120. At this time, the elevating member 262 is lifted by the restoring force of the spring 264. Thus, the clutch gear 261 engages with the first connecting gear 181. Also, the motor 160 drives the cam member 141. Thus, the subdeck 150 is rotated upward. Simultaneously, the moving member 210 engaged with the second gear 104 is transported toward the turntable 151 by the driving force of the motor 101.

Figure 9:
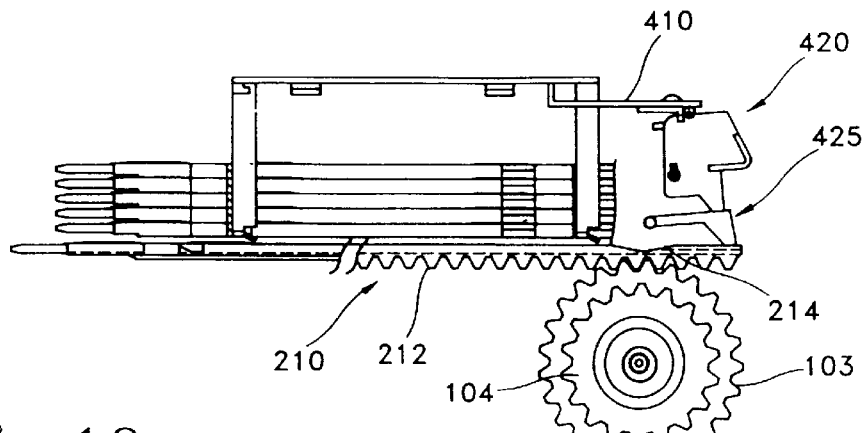
FIGS. 9 to 11 are schematic diagrams each showing a lifting unit according to the movement of the moving member shown in FIG. 8.
Figure 10:
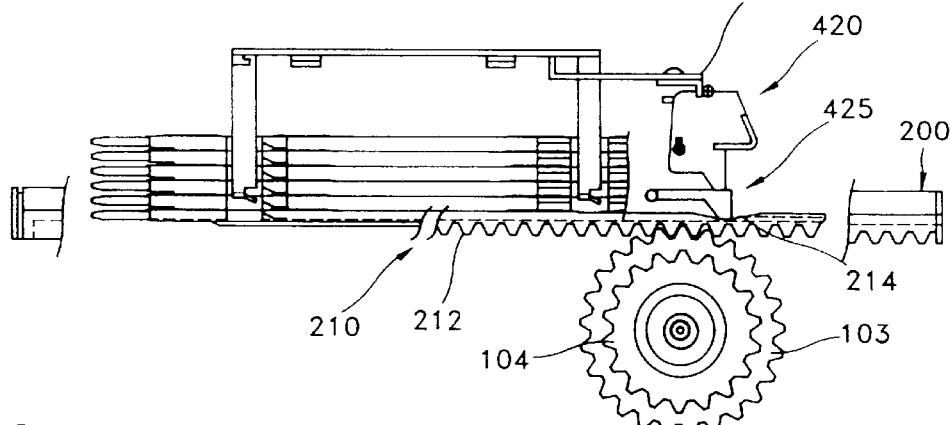
Figure 11:
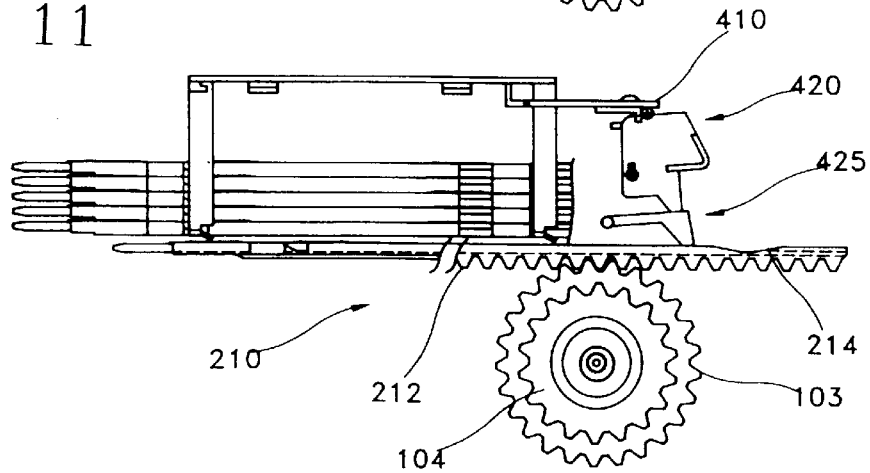
Figure 13:
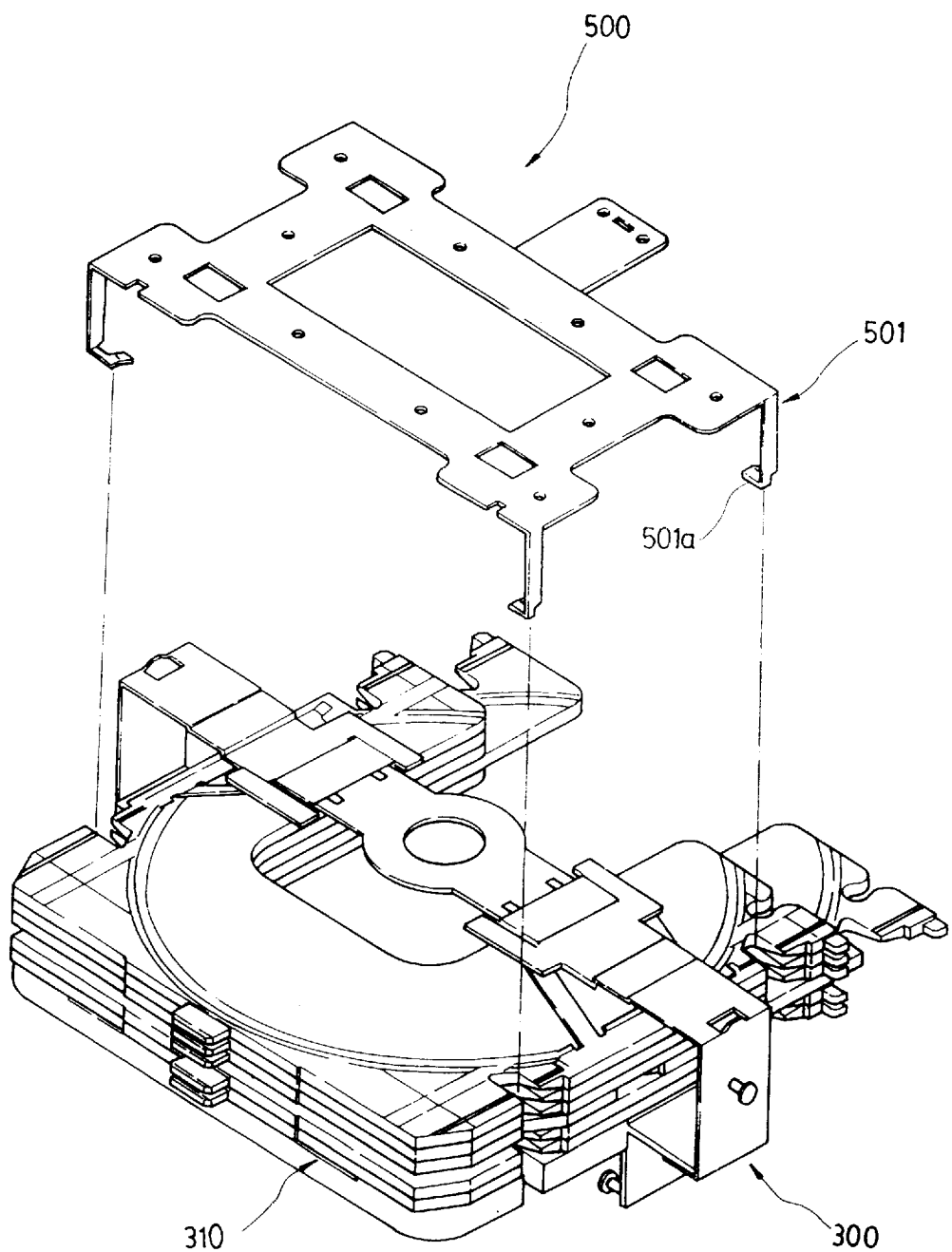
FIG. 13 is a perspective view of the lifting unit.
Figure 14:
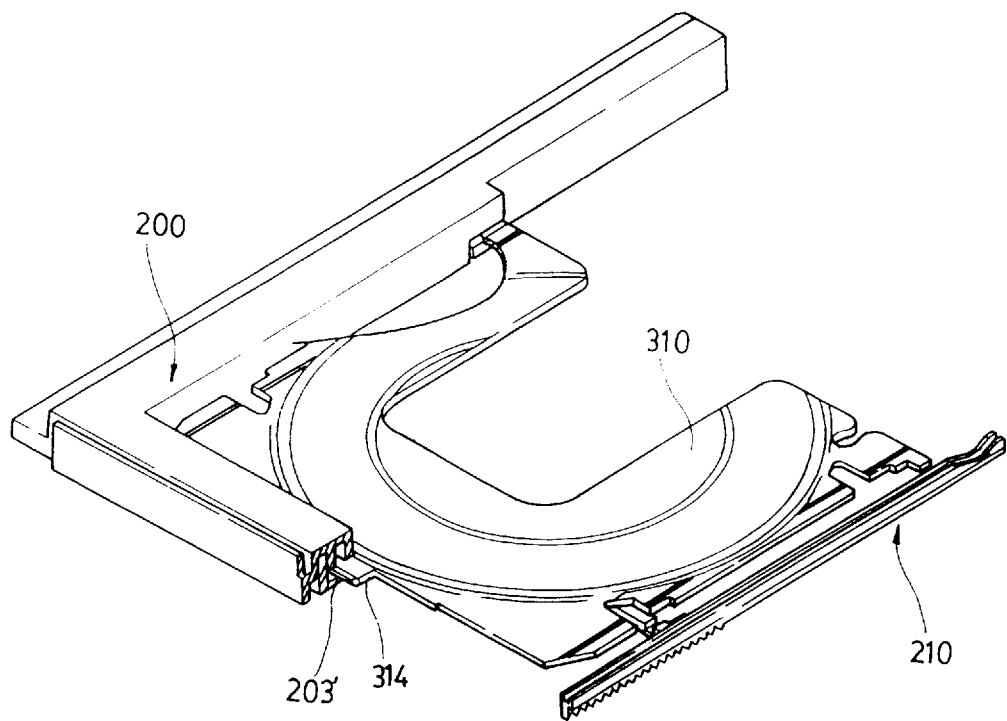
FIG. 14 is a perspective view of a subtray combined with the main tray shown in FIG. 4.

Referring to FIGS. 9 through 11, when the moving member 210 is moved, the engaging member 425 is pivoted upward in engagement with the upper surface of the moving member 210. Accordingly, the rotating body 420 and lever member 410 are pivoted to thereby move the support plate 500 (see FIG. 2). At this time, as shown in FIG. 13, the support portions 501a of the support plate 500 enter the sloped surfaces 315a through 315d (see FIG. 3) of the subtrays 310, respectively. Thus, the other subtrays 310 placed over the selected subtray 310 are supported by the support plate 500. Also, the auxiliary protrusions 116, 117 and 125 (see FIGS. 2 and 12) formed on the inner sides of the first and second chassis members 110 and 120 are combined with the guide grooves 315a to 315d so that other subtrays 310 positioned under the selected subtray 310 are prevented from departing from the stocker 300.

Figure 16:
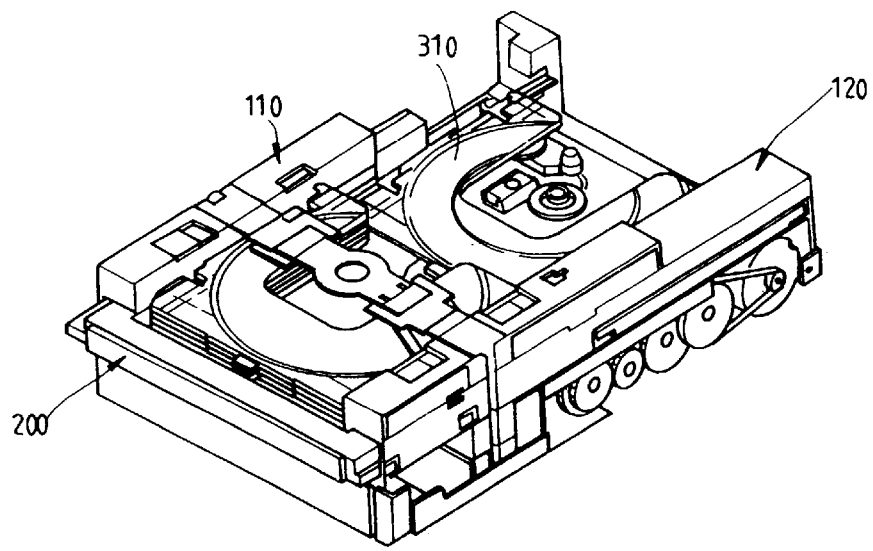
FIG. 16 is a perspective view showing the selected subtray with a disk (omitted for clarity) loaded thereon moved to a reproducing position.

With the non-selected subtrays 310 being supported as described above, the selected subtray 310 is transported toward the upper side of the turntable 151 with the moving member 210 as shown in FIG. 16. At this time, as shown in FIG. 4, the protrusion 211 of the moving member 210 couples with guide groove 315d of the selected subtray 310 so that the selected subtray 310 can move with the moving member 210. The movement of the selected subtray 310 is guided by the guide length grooves 318a and 318b (see FIG. 3) slidably combined with the guide rails 115 (see FIG. 2) formed on the first and second chassis members 110 and 120.

Then, when the selected subtray 310 is positioned over the turntable 151 (FIG. 2), the subdeck 150 pivots upward. At this time, a disk (not shown) is loaded on the turntable 151. Also, when the subdeck 150 pivots further upward, the disk is secured by the clamping member 610. Thereafter, the motor 160 stops driving. In this state, the disk is reproduced by the pickup 152.

Then, the motor 101 is driven to move the moving member 210 toward the stocker 300. At this time, the selected subtray 310 is restored to the stocker 300. As shown in FIG. 10, when the engaging member 425 is positioned on the recessed portion 214 of the moving member 210, the rotating body 420 is restored by the torsion spring (not shown). Thus, the support plate 500 supporting the other subtrays 310 over the selected subtray 310 is restored to the original position. That is, all the subtrays 310 are stacked on top of one another.

During the reproduction of a disk, an action of changing a disk by ejecting a subtray 310 other than the empty subtray 310 is as follows. A subtray 310 on which a disk is loaded is positioned on the same level with the main tray member 200 by the elevating means. The elevating means operates as described above, so that the description thereof will be omitted.

Referring to FIGS. 2, 5 and 7, the moving member 210 engaged with the second gear 104 by the driving force of the motor 101 is moved forward inside the main tray 200. The front edge portion of the moving member 210 which moves as described above contacts the rotating lever 230 so that the rotating lever 230 is rotated. At this time, the main tray 200 releases from the housing 100. Then, the locking protrusion 221 of the moving block 220 combines with the locking groove 213 of the moving member 210. Thus, the moving member 210 locks with the main tray 200. In this state, the rack gear 212 of the moving member 210 separates from the second gear 104. Simultaneously, the rack gear 206 of the main tray 200 engages with the first gear 103.

Meanwhile, during the movements of the moving member 210 and main tray 200, the slide plate 240 is at a standstill. That is, the cam gear 243 which is rotated by the motor 101 is raced, while being combined with the cam pin 241a of the slide plate 240.

Figure 8:
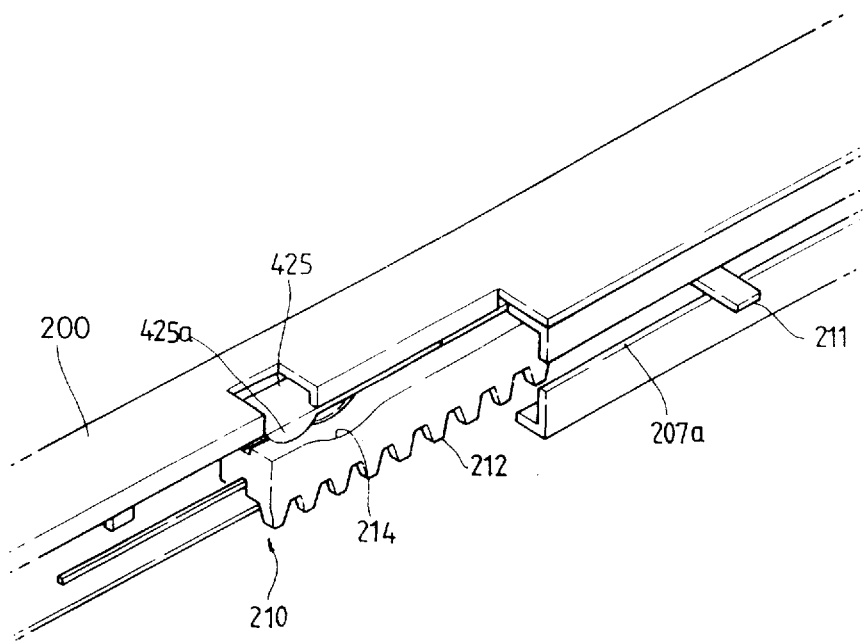
FIG. 8 is a perspective view of essential parts showing the combined state of a moving member shown in FIG. 5.

Referring to FIGS. 8 and 10, with the engaging member 425 positioned on the recessed portion 214 of the moving member 210, if the moving member 210 is moved to the left, the protrusion 425a of the engaging member 425 leaves from the recessed portion 214, and the engaging member 425 pivots upward at the same time. Thus, the support plate 500 supports the other subtrays 310 positioned over the selected subtray 310.

In this state, the main tray 200 is ejected outward from the housing 100 by the driving force of the motor 101. Thus, a disk can be changed. After changing a disk, the subtray 310 enters the stocker 300 in the same manner as above but in a reverse order.

As described above, in the disk reproducing apparatus having a disk changing function according to the present invention, while a selected disk is secured by the clamping means, which is operated by the clutch means, and reproduced, the elevating means is operated by the selection of the clutch means so that the stocker ascends and descends to place a disk to be changed on the same level with the main tray.

The disk reproducing apparatus having a disk changing function according to the present invention includes a clutch means for switching power to selectively perform an action of lifting and lowering the stocker for receiving a plurality subtrays and an action of pivoting a subdeck to secure a disk placed on the reproducing position by a single driving source, which simplifies the structure and reduces the cost.

It is contemplated that numerous modifications may be made to the disk reproducing apparatus of the present invention without departing from the spirit and scope of the invention as defined in the following claims.

What is claimed is:

1. A disk reproducing apparatus having a disk changing function, comprising:

a housing having a main deck and first and second chassis members installed at either side of said main deck;

a subdeck installed on a rear side of said housing, pivotably supported at one side thereof on said first chassis member, and provided with disk reproducing elements including a turntable for loading a disk thereon and an optical pickup for generating and receiving optical beams;

a plurality of subtrays positioned at a front side of said housing, each of said subtrays having a loading surface on which a corresponding said disk is loaded;

a stocker, for receiving said plurality of subtrays, supported on said first and second chassis members and operative to ascend and descend;

a main tray member, slidably supported on said first and second chassis members, for transporting one among said plurality of subtrays to be ejected out of said housing;

first transporting means for moving said main tray;

elevating means for lifting and lowering said stocker to place a selected subtray having the corresponding disk loaded thereon on the same level with said main tray;

second transporting means for moving said selected subtray placed on the same level with said main tray to said turntable;

clamping means for securing said disk loaded on said selected subtray moved to said turntable; and a clutch mechanism, which includes a clutch gear assembly operative to ascend and descend with respect to said main deck, for switching power to selectively drive either said elevating means or said clamping means by a single driving source.

2. The disk reproducing apparatus having a disk changing function as claimed in claim 1, wherein said clutch mechanism further comprises:

a motor installed on said main deck and having a motor gear, for generating power;

a driving gear connected to said motor gear and which is rotated;

a first connecting gear rotatably installed on said main deck and connected to said clamping means;

a second connecting gear rotatably installed on said main deck, connected to said elevating means, and located at a relative position lower than said first connecting gear;

said clutch gear assembly which is installed in engagement with said driving gear and which has a clutch gear which is selectively engaged with either said first connecting gear or said second connecting gear; and operating means for lifting and lowering said clutch gear assembly.

3. The disk reproducing apparatus having a disk changing function as claimed in claim 2, wherein said operating means comprises:

a slide plate having a vertical portion slidably supported on one of said first and second chassis members and an angled horizontal portion having a slot at an angled end thereof;

driving means for moving said slide plate forward and backward in said housing;

a link member slidably installed on said main deck and having a pin for combining with said slot, a lengthwise slot formed along said link member, and extended pieces extending from both sides of said lengthwise slot, each said extended piece having a sloped portion;

a shaft fixedly installed on said main deck, passing through said lengthwise slot, and to which said clutch gear assembly is ascendably and descendibly coupled; and a spring member combined with and positioned around said shaft, for elastically biasing said clutch gear assembly to said sloped portions of said extended pieces, wherein said clutch gear assembly ascends and descends according to movement of said link member so that said clutch gear is selectively engaged with either said first connecting gear or said second connecting gear.

4. The disk reproducing apparatus having a disk changing function as claimed in claim 3, wherein said clutch gear assembly comprises:

a boss rotatably combined with said clutch gear; and an elevating member on which a pair of extended protrusions contacting said sloped portions of said extended pieces, respectively, are formed.

5. The disk reproducing apparatus having a disk changing function as claimed in claim 4, wherein rotation preventing means is further provided for preventing the rotation of said elevating member upon the ascent and descent of said elevating member.

6. The disk reproducing apparatus having a disk changing function as claimed in claim 5, wherein said rotation preventing means comprises:

at least two guide posts extending from a bottom surface of said elevating member; and guide holes into which said guide posts slidably move, formed in said main deck.

7. The disk reproducing apparatus having a disk changing function as claimed in claim 3, wherein said driving means comprises:

a motor;

a cam gear rotatably driven by the power of said motor, and on one surface of which a cam groove is formed; and a cam pin for slidably engaging with said cam groove, formed on said slide plate, wherein said slide plate is moved by the rotation of said cam gear.

8. The disk reproducing apparatus having a disk changing function as claimed in claim 2, wherein said elevating means comprises:

first and second vertical slots formed on said first and second chassis members, respectively;

a slide member combined with said main deck and operative to slide forward and backward, and having a horizontal portion on which a rack gear portion connected to said second connecting gear is formed and vertical portions on which first and second stepped slots are formed at either side of said horizontal portion; and first and second guide pins for engaging with said first and second vertical slots, and first and second combining pins for combining with said first and second stepped slots, respectively, formed at either side of said stocker, wherein said stocker ascends and descends by said slide member moving forward and backward by the rotation of said second connecting gear.

9. The disk reproducing apparatus having a disk changing function as claimed in claim 2, wherein said clamping means comprises:

a cam pin formed on another side of said subdeck;

a cylindrical cam member rotatably installed on said main deck, and having a cam groove with which said cam pin is slidably combined, formed on an outer circumferential surface thereof and a gear portion which is connected to said first connecting gear; and a fixing block provided over said subdeck, fixedly installed on said first and second chassis members, and on which a clamp member for pressing down on an upper surface of a selected disk loaded on said turntable is supported.

10. A disk reproducing apparatus having a disk changing function, comprising:

a housing having a main deck and first and second chassis members installed at either side of said main deck;

a subdeck installed on a rear side of said housing, pivotably supported at one side thereof on said first chassis member, and provided with disk reproducing elements including a turntable for loading a disk thereon and an optical pickup for generating and receiving optical beams;

a plurality of subtrays positioned at a front side of said housing, each of said subtrays having a loading surface on which a corresponding said disk is loaded;

a stocker, for receiving said plurality of subtrays, supported on said first and second chassis members and operative to ascend and descend;

a main tray member, slidably supported on said first and second chassis members, for transporting one among said plurality of subtrays to be ejected out of said housing;

a first transporting mechanism for moving said main tray;

an elevating mechanism for lifting and lowering said stocker to place a selected subtray having the corresponding disk loaded thereon on the same level with said main tray;

a second transporting mechanism for moving said selected subtray placed on the same level with said main tray to said turntable;

a clamping mechanism for securing said disk loaded on said selected subtray moved to said turntable; and a clutch mechanism for switching power to selectively drive either said elevating mechanism or said clamping mechanism by a single driving source, wherein said clutch mechanism comprises:

a motor installed on said main deck and having a motor gear, for generating power;

a driving gear connected to said motor gear and which is rotated;

a first connecting gear rotatably installed on said main deck and connected to said clamping mechanism;

a second connecting gear rotatably installed on said main deck, connected to said elevating mechanism, and located at a relative position lower than said first connecting gear;

a clutch gear assembly which is installed in engagement with said driving gear and operative to ascend and descend with respect to said main deck and having a clutch gear which is selectively engaged with either said first connecting gear or said second connecting gear; and an operating mechanism for lifting and lowering said clutch gear assembly.

* * * * *